(12) United States Patent
Jones et al.

(10) Patent No.: US 11,010,154 B2
(45) Date of Patent: May 18, 2021

(54) SYSTEM AND METHOD FOR IMPLEMENTING COMPLEX PATCHING MICRO SERVICE AUTOMATION

(71) Applicant: JPMorgan Chase Bank, N.A., New York, NY (US)

(72) Inventors: Andrew E. Jones, Dublin, OH (US); Maibam Susanta Singh, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/536,487

(22) Filed: Aug. 9, 2019

(65) Prior Publication Data
US 2021/0042105 A1    Feb. 11, 2021

(51) Int. Cl.
*G06F 8/65* (2018.01)
*G06F 9/48* (2006.01)
*G06F 9/445* (2018.01)
*G06F 9/4401* (2018.01)

(52) U.S. Cl.
CPC ............... *G06F 8/65* (2013.01); *G06F 9/445* (2013.01); *G06F 9/485* (2013.01); *G06F 9/4401* (2013.01)

(58) Field of Classification Search
CPC .................................. G06F 8/65; G06F 9/485
See application file for complete search history.

(56) References Cited

U.S. PATENT DOCUMENTS

| | | | | |
|---|---|---|---|---|
| 7,685,591 B2 * | 3/2010 | Barr | ................... | G06F 8/65 709/221 |
| 8,601,000 B1 * | 12/2013 | Stefani | ................ | G06F 16/278 707/747 |
| 9,274,782 B2 * | 3/2016 | Adderly | ................ | G06Q 10/06 |
| 2011/0138374 A1 * | 6/2011 | Pal | .................. | G06F 8/656 717/169 |
| 2012/0174086 A1 * | 7/2012 | Raju | ................... | G06F 9/45504 717/168 |
| 2016/0004528 A1 * | 1/2016 | Price | ................... | G06F 8/65 717/173 |
| 2016/0283219 A1 * | 9/2016 | Banford | ............... | G06F 8/658 |
| 2018/0322540 A1 * | 11/2018 | Phadnis | ............ | G06Q 30/0277 |
| 2019/0146830 A1 * | 5/2019 | Gerber | .................. | G06F 9/466 718/101 |
| 2019/0163463 A1 * | 5/2019 | Bulut | ................... | G06F 8/65 |

* cited by examiner

*Primary Examiner* — Philip Wang
(74) *Attorney, Agent, or Firm* — Hunton Andrews Kurth LLP

(57) ABSTRACT

An embodiment of the present invention is directed to implementing a complex patching micro service architecture. An embodiment of the present invention is directed to controlling and managing patching of complex patterns using a micro service architecture. Using a defined library of micro services, an application owner may build a configuration to follow for patching routines. The configuration may be used as reference data and further used to establish a workflow for each patching iteration.

14 Claims, 3 Drawing Sheets

SYSTEM AND METHOD FOR IMPLEMENTING COMPLEX PATCHING MICRO SERVICE AUTOMATION

FIELD OF THE INVENTION

The invention relates generally to a system and method for implementing complex patching micro service automation.

BACKGROUND OF THE INVENTION

Within server patching, the process of loading security updates occurs on a monthly or other periodic cycle. While many systems are able to simply pick a date and time to perform the updates, other servers require the additional complexity of removing business load from the application prior to achieving a ready-to-update state. For example, a large number of servers or clusters may have interdependencies that cannot simply be patched and then rebooted.

Current configuration manager tools have limited features in achieving complex patching. Such tools generally support loading and scheduling security updates. However, current systems do not enable multiple hosts to follow a series of pre and post steps surrounding patching.

These and other drawbacks exist.

SUMMARY OF THE INVENTION

According to one embodiment, the invention relates to a system that implements complex patching micro service automation. The system comprises: a storage component configured to store patching configuration and schedule data; and a computer processor, coupled to the storage component and a communication network, configured to perform the steps of: initiating, via a patch scheduling API, a scheduling process for a patching configuration; accessing, via a database, the patching configuration and scheduling data wherein the patching configuration comprises a set of pre-patching steps; patching steps and post-patching steps; generating a dynamic workflow and schedule based on the patching configuration and scheduling data, the dynamic workflow comprising a micro service workflow; applying one or more entitlements to the dynamic workflow; responsive to the schedule, executing the micro service workflow; and transmitting status data associated with the micro service workflow to an interactive user interface.

According to another embodiment, the invention relates to a method that implements complex patching micro service automation. The method comprises the steps of: initiating, via a patch scheduling API, a scheduling process for a patching configuration; accessing, via a database, the patching configuration and scheduling data wherein the patching configuration comprises a set of pre-patching steps; patching steps and post-patching steps; generating a dynamic workflow and schedule based on the patching configuration and scheduling data, the dynamic workflow comprising a micro service workflow; applying one or more entitlements to the dynamic workflow; responsive to the schedule, executing the micro service workflow; and transmitting status data associated with the micro service workflow to an interactive user interface.

The system may include a specially programmed computer system comprising one or more computer processors, interactive interfaces, electronic storage devices, and networks. The computer implemented system, method and medium described herein provide unique advantages to entities, organizations and other users, according to various embodiments of the invention. An embodiment of the present invention is directed to facilitating a fully automated state of any patching requirement. An embodiment of the present invention provides workflow automation that allows multiple hosts to follow a series of pre and post patching steps. Other solutions that attempt to solve every feature that a client would use do not account for a specialized customization that enables building and implementing new micro services. An embodiment of the present invention further provides flexibility of workflows a feature not available in current systems and tools. For example, any series of servers can go into a patching workflow. An embodiment of the present invention pays respect to an absolute order of operations to follow and considers interdependencies between servers and/or clusters. For instance, if an application server must come down before a database server, then both servers get patched, and then come up in an opposite order, according to an embodiment of the present invention.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to controlling and managing patching of complex patterns using a micro service architecture. This solution may leverage a system center configuration manager and IT orchestration engine. Other software provisioning, configuration management and application deployment tools may be implemented. Using a defined library of micro services, an application owner may build a configuration to follow for patching routines. The configuration may be used as reference data and further used to establish a workflow for each patching iteration. Micro services may be user-contributed with a firmwide Automation as a Service solution. For example, if a set of micro services do not fit or address a client need, an embodiment of the present invention may enable a user to contribute a micro service that helps them finish a particular patching model.

An embodiment of the present invention facilitates implementing various patching requirement and further provides flexibility of workflows. For example, any series of servers may go into a patching workflow. An embodiment of the present invention maintains an order of operations to follow. For example, if an application server must come down before a database server, then they both get patched, and come up in the opposite order.

An embodiment of the present invention may be scalable to support other operating systems, including Linux patching. Within a banking application, an embodiment of the present invention provides other opportunities to define reference data and automate a series of steps during a lengthy activity. This may include DR failover activities, patching, application startup and shutdown, and various other automation sequencing actions.

Figure 1:
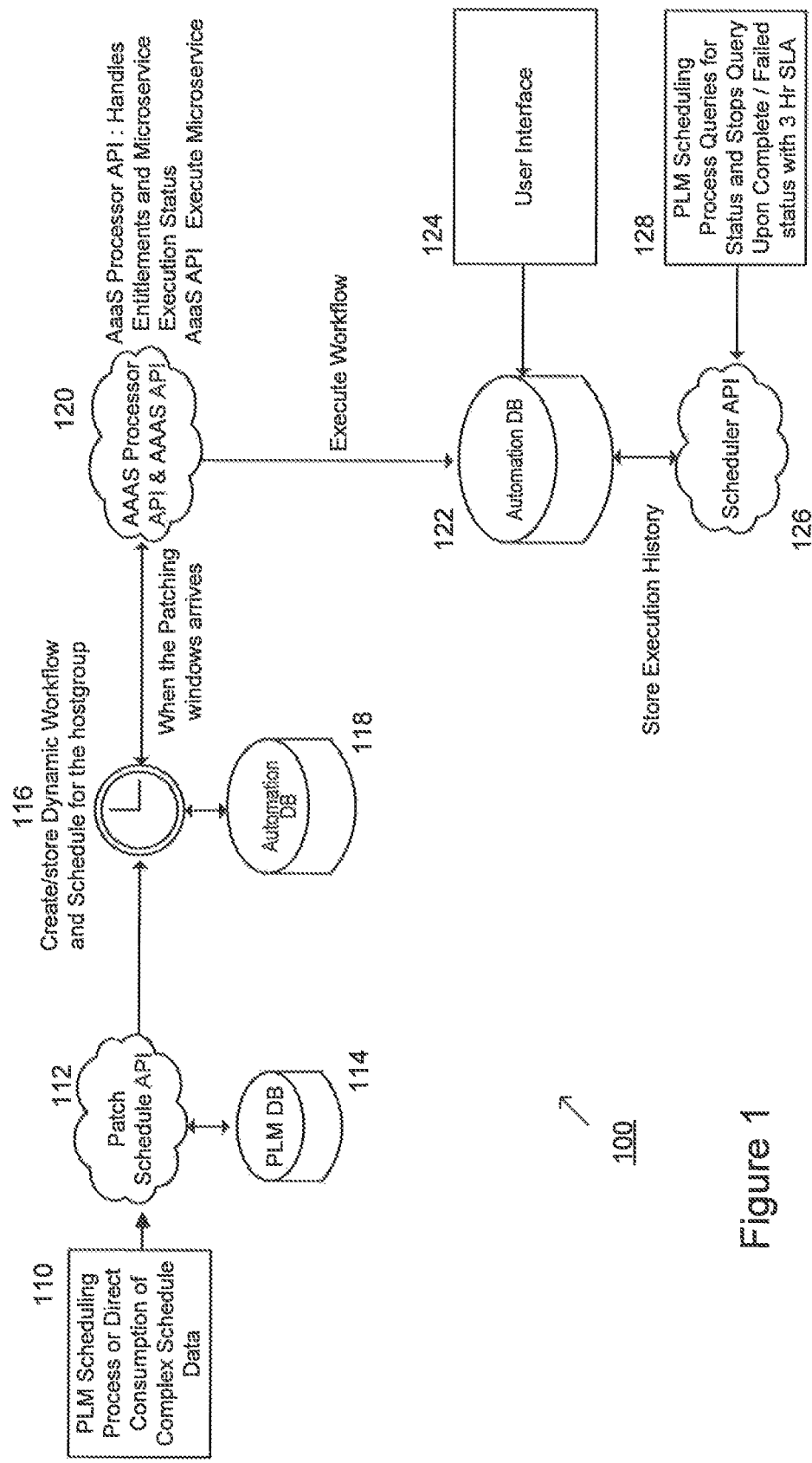
FIG. 1 illustrates a system that implements complex patching micro service automation, according to an embodiment of the present invention.

FIG. 1 illustrates a system that implements a complex patching micro service architecture, according to an embodiment of the present invention. A patching configuration and schedule may be created through a user interface. This may involve Pre-Patching steps; Patching steps and Post-Patching steps. The steps may be applied to a host server, a server group and/or other combination of servers, devices and components. Pre-Patching steps may include: Change Service Manual-Service A and Stop Service-Service A. Patching steps may include: Initiate Patching; Initiate Reboot; Wait for Host Connectivity and Pull Patching Status to Validate. Post-Patching steps may include: Change Service Automatic-Service A and Start Service-Service A. These steps are merely exemplary; other steps may be applied in accordance with the various embodiments of the present invention.

As shown in FIG. 1, a product lifecycle management (PLM) scheduling process may be initiated. This may include a direct consumption of complex schedule data. Complex schedule data may be received by Patch Schedule API 112. Patching configuration and schedule data may be accessed from a PLM Database 114. Dynamic Workflow and Schedule 116 may be generated for a hostgroup. Automation, workflow and scheduling data may be stored and managed at Automation Database 118. When the patching window arrives, Automation as a Service (AaaS) processor application programming interface (API) and AaaS API may be used to handle entitlements and micro service execution status. For a given set of hosts, depending on server owner, there may be a different entitlement account that maintains a least privilege to action a set of micro services against those hosts. For example, the automation process may perform a look-up for what access account should be used to perform a desired level of action on the target host. Execution statuses may include: Executing, Completed, Error, etc. Status may be attributed to error codes or a standard output to assist in troubleshooting under various conditions, e.g., if an error occurs, if the process exited normally under good conditions, etc. Other variations may be implemented.

AaaS API may execute the micro service. The workflow may be executed and then related data stored in Automation Database 122. User Interface 124 may be provided for user access and interaction. For example, a live dashboard may be generated for PLM shift leads to review status perform functions, including retry, abort, etc. Execution history data may be stored via Scheduler API 126. PLM scheduling process 128 may query for status and may stop the query upon completion or failure status. A time limit may be applied, such as 3 hours SLA.

The components illustrated in FIG. 1 are merely exemplary, other devices may be represented in various applications. While a single component is illustrated, each component may represent multiple components.

An entity, such as a financial institution, may host a Complex Patching Micro Service architecture of an embodiment of the present invention. The entity may support the Complex Patching Micro Service architecture as an integrated feature or system. According to another example, the Complex Patching Micro Service architecture may be offered by a third party service provider. Other scenarios and architectures may be implemented. An embodiment of the present invention may send and/or receive data from various other sources represented by databases. Data may be stored and managed in storage components via one or more networks. Databases may include any suitable data structure to maintain the information and allow access and retrieval of the information. The storage may be local, remote, or a combination thereof with respect to Databases. Communications with Databases may be over a network, or communications may involve a direct connection between Databases and Entity, as depicted in FIG. 1. Databases may also represent cloud or other network based storage.

A user of an embodiment of the present invention may communicate with the Complex Patching Micro Service Architecture via a network through a User Interface. Communication may be performed using any mobile or computing device, such as a laptop computer, a personal digital assistant, a smartphone, a smartwatch, smart glasses, other wearables or other computing devices capable of sending or receiving network signals.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
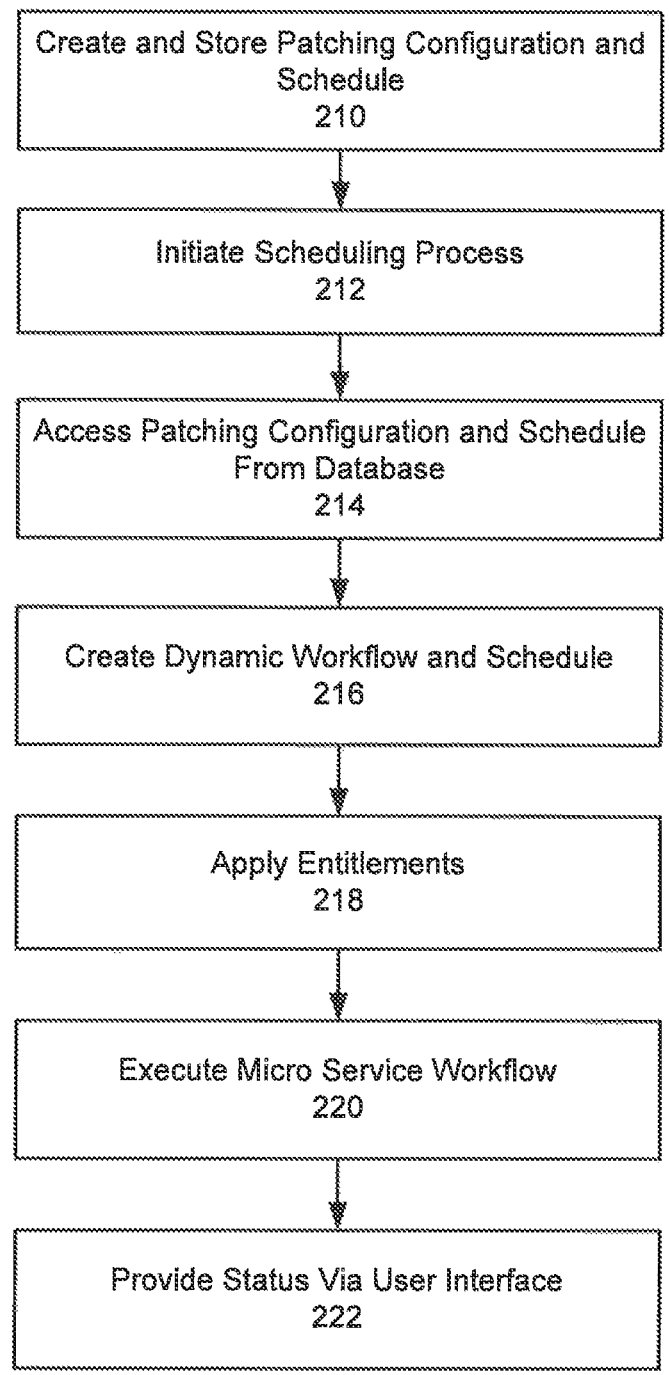
FIG. 2 illustrates an exemplary flow chart of complex patching micro service automation, according to an embodiment of the present invention.

FIG. 2 illustrates an exemplary flow chart of a complex patching micro service architecture, according to an embodiment of the present invention. At step 210, a patching configuration and schedule may be created and stored in a database. The associated configuration data may be specific to an application. The patching configuration may include a set of steps including pre-patching steps, patching steps and post-patching steps. An embodiment of the present invention may further associate one or more steps to a specific host or hosts. For example, a first step may be applicable to a first host; a second step may be applicable to both hosts (e.g., first host and second host); and the last step may be associated with another host. Other specifics may be identified. At step 212, a scheduling process may be initiated. At step 214, the patching configuration and schedule may be accessed from the database. At step 216, a dynamic workflow and schedule may be created. At step 218, entitlements may be applied. At step 220, a micro service workflow may be executed. At step 222, status may be provided via an interactive user interface, such as a live dashboard. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
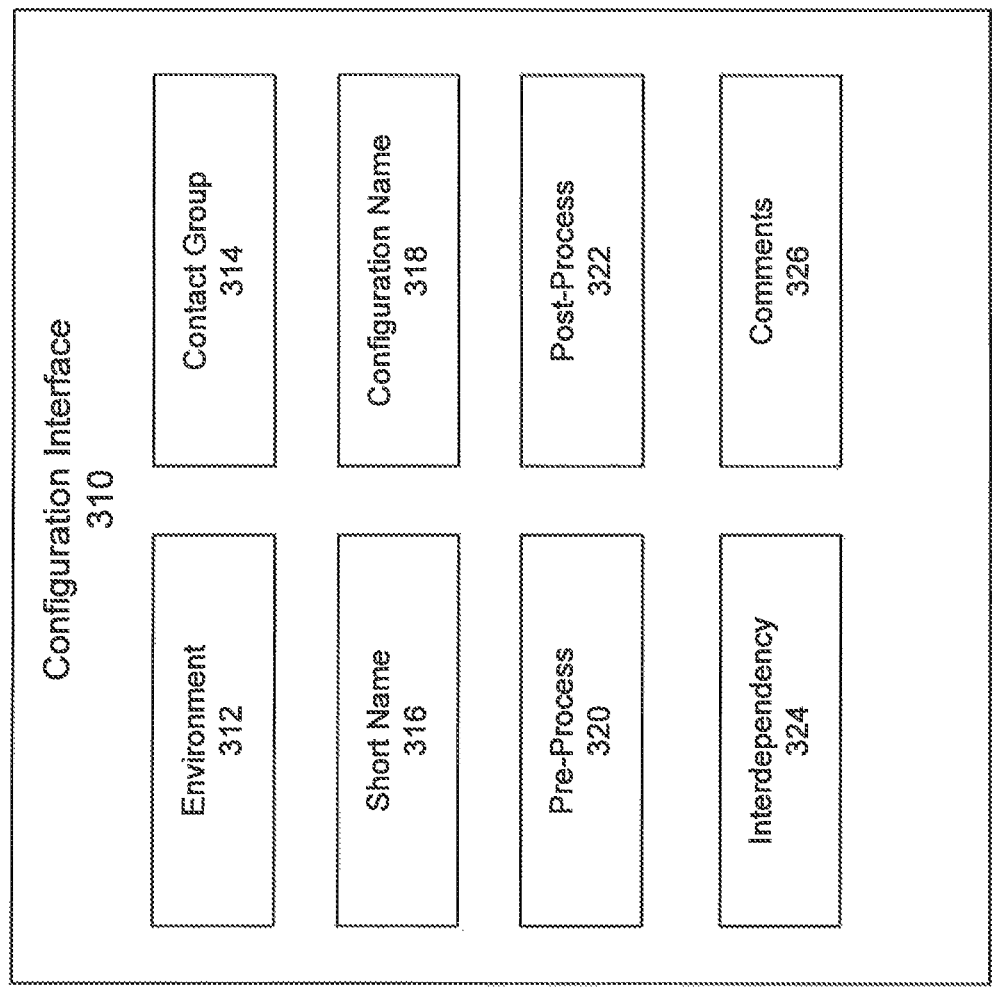
FIG. 3 is an exemplary interactive user interface, according to an embodiment of the present invention.

FIG. 3 is an exemplary interactive user interface, according to an embodiment of the present invention. As shown in FIG. 3, a user may create a configuration file. Configuration data may include Environment 312, Contact Group 314, Short Name 316, Configuration Name 318, Pre-Process 320, Post-Process 322, Interdependency 324 and Comments 326. Environment 312 may include UAT, for example. Pre-Process 320 may include pre-processing notes, e.g., Drain Cluster Node Backup, Trigger Software Updates Installation, Reboot, and Drain Cluster Node Restore. Post-Process 322 may include post process notes, e.g., Drain Cluster Node Backup, Trigger Software Updates Installation, Reboot, and Drain Cluster Node Restore. With an embodiment of the present invention, the Pre-Process 320 and Post-Process 322 may be converted into micro service payloads of the complex patching workflow. Interdependency 324 may indicate a no or yes determination. If no, an embodiment of the present invention may de-scope (e.g., exclude from patching) one or more servers in the configuration so that the remaining servers may be patched. If yes, an embodiment of the present invention may not de-scope servers. For example, if one or more servers are de-scoped, the workflow itself may be cancelled and no servers may be patched.

An embodiment of the present invention may implement various micro services. A set of general purpose micro services may include: Trigger Software Updates Installation; Send Email; Backup Restore Registry Keys; Drain Cluster Node Resources to Target Node; Get Targeted Updates; Shutdown Reboot Host; Set Services; Run Script and Files and Folders Management. If a set of micro services do not address a client need, an embodiment of the present invention may enable a user to contribute a micro service for a particular patching model.

Trigger Software Updates Installation micro service may trigger any targeted software updates that are due in a software center application. When used within a playbook, it may be used with before and after patching actions (e.g., stop a specific service, install software updates, reboot system, start a specific service, etc.)

Send Email micro service may send an email and may be paired with a playbook for sequence-specific notifications and/or other actions.

Backup Restore Registry Keys micro service may backup, restore and/or query one or more registry keys.

Drain Cluster Node Resources to Target Node micro service may move resources associated with a node to a target node. This micro service may be used when a host needs to be brought down for any activity.

Get Targeted Updates micro service may get an available update against a host. This may be a read-only operation that may pair with triggering software updates and may allow selection of specific patches retrieved from this service.

Shutdown Reboot Host micro service may shutdown and/or reboot a host.

Set Services micro service may start, stop, and/or restart a service or change a startup type.

Run Script micro service may involve executing an application specific custom script on one or more hosts. Prior to a micro service conversion, unmanaged scripts may be found locally on the system where they ran.

Files and Folders Management micro service may involve managing files and/or folders as well as other data in various formats.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a complex patching micro service architecture, the system comprising:
    a storage component configured to store patching configuration and scheduling data; and
    a computer processor, coupled to the storage component and a communication network, configured to perform steps comprising:
        initiating, via a patch scheduling API, a scheduling process for a patching configuration wherein the patching configuration comprises actions comprising pre-patching steps, patching steps, and post-patching steps and the actions of the patching configuration are associated with one or more servers;
        receiving schedule data, by the patch scheduling API, from the storage component;
        creating a micro service workflow from the scheduling data and patching configuration, the micro service workflow comprising an order of operations to be observed during the patching;
        responsive to a patching window, executing the micro service workflow by an Automation as a Service (AaaS) Processor API;
        storing data related to the micro service workflow in the storage component;
        performing a look-up for an appropriate access account to perform the micro service workflow on a target and performing the micro service workflow using the appropriate access account;
        transmitting status data associated with the micro service workflow to an interactive user interface; and
        displaying the status data on a live dashboard, on the interactive user interface; comprising a status of the micro service workflow.

2. The system of claim 1, further comprising receiving via the interactive user interface a user initiated action comprising retry or abort.

3. The system of claim 1, wherein execution history is stored via the patch scheduling API.

4. The system of claim 3, wherein the patch scheduling API is queried for status.

5. The system of claim 1, wherein the pre-patching steps comprise stopping a service.

6. The system of claim 1, wherein the post-patching steps comprise starting a service.

7. The system of claim 1, wherein the patching steps comprise initiating patching and initiating a reboot.

8. A method that implements a complex patching micro service architecture, the method comprising the steps of:
    initiating, via a patch scheduling API, a scheduling process for a patching configuration wherein the patching configuration comprises actions comprising pre-patching steps, patching steps, and post-patching steps and the actions of the patching configuration are associated with one or more servers;
    receiving schedule data, by the patch scheduling API, from the storage component;
    creating a micro service workflow from the scheduling data and patching configuration, and the micro service workflow comprises an order of operations to be observed during the patching;
    responsive to a patching window, executing the micro service workflow by an Automation as a Service (AaaS) Processor API;
    storing data related to the micro service workflow in the storage component;
    performing a look-up for an appropriate access account to perform the micro service workflow on a target and performing the micro service workflow using the appropriate access account;
    transmitting status data associated with the micro service workflow to an interactive user interface; and displaying the status data on a live dashboard on the interactive user interface; comprising a status of the micro service workflow.

9. The method of claim 8, further comprising receiving a user initiated action via the interactive user interface that comprises retry or abort.

10. The method of claim 8, wherein execution history is stored via the patch scheduling API.

11. The method of claim 10, wherein the patch scheduling API is queried for status.

12. The method of claim 8, wherein the pre-patching steps comprise stopping a service.

13. The method of claim 8, wherein the post-patching steps comprise starting a service.

14. The method of claim 8, wherein the patching steps comprise initiating patching and initiating a reboot.

* * * * *